United States Patent [19]

Plunkett, Jr.

[11] Patent Number: 4,468,751
[45] Date of Patent: Aug. 28, 1984

[54] DICTATION RECORDING AND TRANSCRIBING SYSTEM WITH VARIABLE PLAYBACK SEQUENCE

[75] Inventor: Luther C. Plunkett, Jr., Atlanta, Ga.

[73] Assignee: Lanier Business Products, Inc., Atlanta, Ga.

[21] Appl. No.: 262,176

[22] Filed: May 11, 1981

[51] Int. Cl.[3] .................. G11B 27/28; G11B 27/22; G06F 3/153

[52] U.S. Cl. ........................... 364/900; 360/55

[58] Field of Search ............ 369/25, 26, 27, 29; 360/137, 55, 92, 69, 72.1, 72.2, 1, 12, 13, 14, 27; 364/900, 200; 179/6.04, 6.05, 6.01

[56] References Cited

U.S. PATENT DOCUMENTS

| | | | |
|---|---|---|---|
| 3,293,613 | 12/1966 | Gabor | 340/172.5 |
| 3,302,185 | 1/1967 | Cox et al. | 340/172.5 |
| 3,405,457 | 10/1968 | Bitzer | |
| 3,648,249 | 3/1962 | Goldsberry | |
| 3,648,255 | 3/1972 | Beausoleil et al. | 340/172.5 |
| 3,931,615 | 1/1976 | Oliver et al. | 364/900 |
| 3,936,805 | 2/1976 | Bringol et al. | 340/172.5 |
| 3,940,742 | 2/1976 | Hudspeth et al. | 364/900 |
| 3,942,158 | 3/1976 | Dummermuth | 364/900 |
| 4,090,250 | 5/1978 | Carlson et al. | 364/900 |
| 4,093,831 | 6/1978 | Sharp et al. | 369/25 |
| 4,166,289 | 8/1979 | Murtha et al. | 364/200 |
| 4,213,189 | 7/1980 | Mueller et al. | 364/900 |
| 4,221,933 | 9/1980 | Cornell et al. | 179/6 C |
| 4,254,307 | 3/1981 | Plunkett, Jr. | 369/26 |
| 4,260,854 | 4/1981 | Kolodny et al. | 179/6.09 |
| 4,321,635 | 3/1982 | Tsuyuguchi | 369/25 |
| 4,371,752 | 2/1983 | Matthews et al. | 179/7.1 |
| 4,375,083 | 2/1983 | Maxemchuk | 364/900 |
| 4,430,726 | 2/1984 | Kasday | 364/900 |

OTHER PUBLICATIONS

Maxemchuk et al., "Experiments in Editing Speech," Oct. 1980, pp. 228–232.
Maxemchuk, "An Experimental Speech Storage and Editing Facility," Oct. 1980, pp. 1383–1395.

Primary Examiner—Gareth D. Shaw
Assistant Examiner—Jameson Lee
Attorney, Agent, or Firm—Jones & Askew

[57] ABSTRACT

A central dictation and transcribing system including a plurality of dictate stations (16) and a plurality of transcribe stations (17) in which recorded dictation is recorded in the form of digitized samples. A plurality of selectively operable controls (38, 39, 40, 41, 42, 43, 45, 46) are used to rearrange the reproduced order of dictation heard by the transcriber by inserting, deleting, and moving segments of previously recorded dictation. All final dictation heard by the transcriber is continuous and in an order determined by operation of the controls. The structure includes memory (11, 12) for storing the digitized samples and a map memory (40) for storing a plurality of address pairs (127, 128) indicative of when normal sequential reproduction of digitized samples from the main memory is to be altered. A predetermined jump code (98) is stored at each location in the main memory to indicate that a change of sequence is to be made from that address and reference to the map memory should be made. The samples to and from the dictate stations and transcribe stations are pipelined over data buses (20, 29) in a time division multiplex arrangement (60).

12 Claims, 9 Drawing Figures

Fig_4A

Fig. 6B

DICTATION RECORDING AND TRANSCRIBING SYSTEM WITH VARIABLE PLAYBACK SEQUENCE

TECHNICAL FIELD

The present invention relates to dictation recording and transcribing apparatus. More particularly, the present invention relates to a dictation recording and transcribing system in which segments of dictation of any length may be selectively inserted or deleted without disturbing the continuity during playback for purposes of review or transcription.

BACKGROUND OF THE INVENTION

In recent years, modern dictation recording and transcribing systems have been developed which include many features to aid in the efficient transcription of recorded dictation. As will be appreciated by those familiar with the use of dictation recording apparatus, the thought process of the dictator does not necessarily occur in the sequence in which it is ultimately desired to present dictated material to the transcriber.

For example, partially through a piece of dictation, it often occurs to the dictator to add instructions to the transcribing person. Systems for indicating the presence of instructions and visually displaying their relative location within a piece of dictation are shown in U.S. Pat. Nos. 4,051,540 and 4,200,893.

Furthermore, it has been known to provide a separate track in a multitrack tape format for the recording of instructions so that they may be recorded at an appropriate location relative to the main dictation. Such a system is shown in U.S. Pat. No. 3,916,121. As will be further appreciated by those familiar with dictation systems, the dictator will often think of additional material which should be inserted at a location within previously-recorded dictation. It is known to provide a separate track parallel to the track containing the main recorded dictation upon which such inserts may be recorded. However, in the transcription of the dictation including such an insert recorded on a separate track, the transcriber must first listen to the insert, and then rewind the recording medium back to the point in the original dictation at which the insert began.

Yet another situation often encountered by users of dictation systems is the desire to delete portions of previously-recorded dictation from the final transcribed product.

In prior art systems, it is normally necessary to include an instruction to the transcribing person indicating the portion to be deleted, or to simply erase the portion to be deleted, thus leaving a length of blank tape within the recorded dictation and frequently erasing material which was adjacent the ends of the portion to be deleted.

Some of the limitations of conventional dictation recording and transcribing systems have been overcome in a system shown in U.S. Pat. No. 3,648,249 to Goldsberry. The system of the Goldsberry patent includes all the limitations above noted for conventional dictation recording systems, but provides an interactive scheme between a medium storing transcribed dictation and a CRT display used by the dictator to allow for increased speed of the editing process. The system of Goldsberry removes from the transcriber the burden of ascertaining at what point in transcribed dictation deletions and insertions are to be made and places this process under machine control at the direction of the dictator who uses a cursor to locate insertions or deletions in already transcribed dictation. Thus, in order for an insertion to be made into previously recorded dictation when using the system of Goldsberry, it is necessary (just as in conventional systems) for the original dictation to have been transcribed before the insertion can be made.

It will further be appreciated by users of dictation equipment that while prior art systems indicating the locations of recorded instruction have increased the convenience and efficiency of transcribing dictation, it has still been necessary for the transcriber to wind through a conventional recording medium in order to listen to the instructions prior to beginning transcription.

It will further be appreciated that, as a general rule, the last instruction recorded during the dictation process is often the most important and may be used to override previously-recorded instructions if the dictator has changed his or her mind.

Thus, while prior dictation recording and transcribing systems have made improvements in the convenience of providing instructions, insertions, and deleting material; the prior art has heretofore not provided apparatus which allows the dictator to insert material of any desired length in previously-recorded dictation and still have a continuous playback to the transcriber of a first portion of recorded dictation, inserted material, and a second portion of dictation without any rewinding of a record medium or additional steps to be taken by the transcriber. Similarly, it has not been known how to delete portions of dictation from previously-recorded dictation without leaving a segment of silent tape which leaves the transcriber idle during the transcription process or by recording an instruction indicating that certain portions of the dictation should be skipped.

SUMMARY OF THE INVENTION

It is a primary objective of the present invention to provide a dictation recording and transcribing apparatus which allows maximum flexibility to the dictator during the dictation process and also provides a continuous playback in the desired sequence, without interruption or separate steps of winding a record medium on the part of the transcriber.

It is an object of the present invention to provide a dictation recording and transcribing system in which additional material may be inserted into previously-recorded dictation without regard to length of the inserted material, and which will provide to the dictator and transcriber upon playback the desired sequence of recorded dictation, including the inserted material, in a manner in which the listener is unaware that any insertion process ever took place.

It is also an object of the present invention to provide a dictation recording and transcribing apparatus which will allow the deletion of portions of previously-recorded dictation by the dictator and which will, upon playback for transcription or review, immediately skip the deleted portion without any further action on the part of the transcriber.

It is further an object of the present invention to provide a dictation recording and transcribing system in which instructions recorded in a particular order by the dictator will be played back in a last in/first out (LIFO) arrangement upon the beginning of playback for transcription and which will provide all instructions to the transcriber before any recorded dictation is reproduced. Furthermore, it is an object of the present invention to not only reproduce the instructions at the beginning of the playback for transcription process, but to subsequently remove the instructions from the playback sequence, regardless of the point in the originally-recorded dictation the dictator recorded such instructions.

The present invention accomplishes the above-noted objectives and provides additional desirable features by making use of a random access medium as the basic recording medium of the system. The use of a random access medium overcomes the above-noted shortcomings of conventional recording systems using sequential access media and allows the present invention to accomplish its above-noted objectives.

The present invention generally comprises an array of random access memory for storing signals corresponding to recorded dictation, a map memory for storing information relating to the sequence in which portions of the random access memory are to be read out during playback, a plurality of dictate stations, a plurality of transcribe stations, and a central processing unit for accepting signals from the dictation and transcribe stations and controlling the flow of signals to and from the random access memory array.

In its preferred form the present invention performs an analog to digital conversion on the speech provided by the dictator and stores digital signals corresponding to the recorded dictation. A digital to analog conversion is provided during playback for transcription or for review by the dictator.

The preferred form of the present invention also uses a time division multiplexed arrangement in the transfer of digitized speech signals to and from the random access memory. This arrangement takes advantage of the relatively low sampling rate necessary to digitize speech and the fact that data transfers may be effected at a considerably faster rate once the conversion has taken place.

That the present invention accomplishes the objectives set forth above will be appreciated from the detailed description of the preferred embodiment to follow.

DETAILED DESCRIPTION

Figure 1:
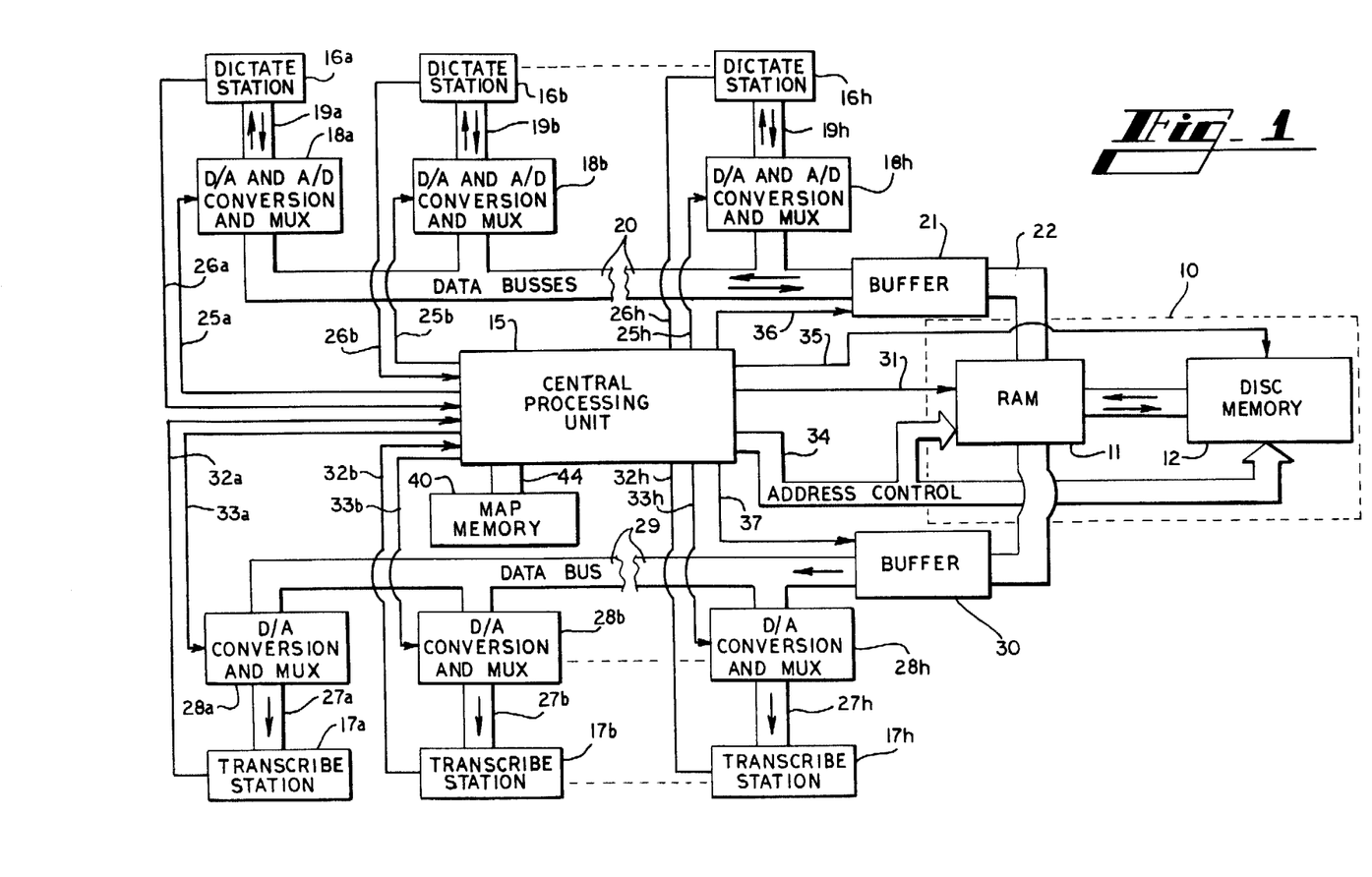
FIG. 1 is a block diagram of the preferred embodiment of the present invention.

The following description is made with reference to the drawing figures in which like numerals reference like parts. Turning first to FIG. 1, a simplified block diagram of the present invention may be seen. The preferred embodiment of the present invention is constructed around a random access memory array 10 which preferably has substituents of high speed solid state random access memory 11 and disc memory 12. A central processing unit (CPU) 15 controls the flow of information within the system.

A plurality of dictate stations 16a, 16b through 16h are shown as well as a plurality of transcribe stations 17a, 17b through 17h.

Thus it will be appreciated that the preferred embodiment disclosed herein is arranged to accommodate eight dictate stations and eight transcription stations. The selection of eight dictation and transcription channels should not be considered to limit the scope of the present invention and is used in the preferred embodiment in part because of the ratio of actual data transfer time to conversion period present in the digital-to-analog and analog-to-digital conversion devices used in the preferred embodiment. It will be apparent that the use of devices with a lower ratio of data transfer time to conversion period or the use of plural parallel channels to a random access array can increase the number of dictate and transcribe stations, once the disclosure of the present invention is understood.

Each of dictate stations 16 is connected to one of blocks 18a-18h via a two-way audio connecting path 19a-19h, respectively. As is indicated on FIG. 1, each of blocks 18a-18h includes digital to analog (D/A) and analog to digital (A/D) conversion functions and a multiplexing function. The outputs of converters and multiplexers 18 are all tied to a set of bidirectional data buses represented as 20. Data buses 20 are buffered at buffer 21 which is connected through bus 22 to RAM 11.

It will thus be appreciated that audio signals are provided from dictate station 16 through converters 18 providing digitized signals to be stored in RAM 11 during dictation. Similarly, during review of dictation at dictate stations 16 digitized data is read out of RAM 11 converted to analog at converters 18 and provided along audio path 19 to each of dictate stations 16.

One of lines 25a-25h is connected to each of converter and multiplexer blocks 18a-18h from CPU 15 to indicate that conversion is carried out under control of the central processor. Connections denoted as 26a-26h connect each of stations 16a-16h to CPU 15 indicating that signaling from the dictate stations is provided to the CPU in order to effect the proper data transfers in the system.

The transcribe stations 17 are connected by one-way audio links 27 to digital to analog converters 28. Converters and multiplexers 28 are in turn connected to a data bus 29 which carries digitized data from RAM 11 through buffer 30 to converters 28. It will be appreciated that since only a listen function occurs at transcribe stations 27, there is no need to make any provision for analog to digital conversion in converters and multiplexers 28.

Lines 32 are indicative of control connections between transcribe stations 17 and CPU 15 indicating that transcribe stations 17 directly provide control signals to CPU 15 when a transcribe function is to be provided by the system to the particular transcribe station. The details of these functions will be explained hereinbelow. Similarly, connections 33 from CPU 15 to D/A converter and multiplexer blocks 28 indicate that conversions and the timing of the multiplexing arrangement is controlled by processor 15.

Processor 15 controls the reading and writing of data into and out of random access memory 11 and disc memory 12 as shown by lines 31 and 35, respectively. Similarly, the flow of data through buffers 21 and 30 is under the control of CPU 15 as is indicated by lines 36 and 37, respectively.

A main address bus 34 is used to carry address signals from CPU 15 to random access memory array 10.

Also shown in FIG. 1 is map memory 40 directly connected to CPU 15 via data bus and control lines represented as 44.

As will be appreciated from the description of map memory 40 hereinbelow, the memory may comprise a portion of a random access memory array 10 but, it is preferred to have map memory embodied as a separate memory. In a system in which there is sufficient time to service the data transfer needs of all dictate stations 16 and transcribe stations 17 with sufficient remaining time in any complete servicing cycle to also update or refer to the map memory, it would be preferable to include the map as a portion of random access memory array 10 in order to cut down on the number of dedicated connections to CPU 15.

Figure 2:
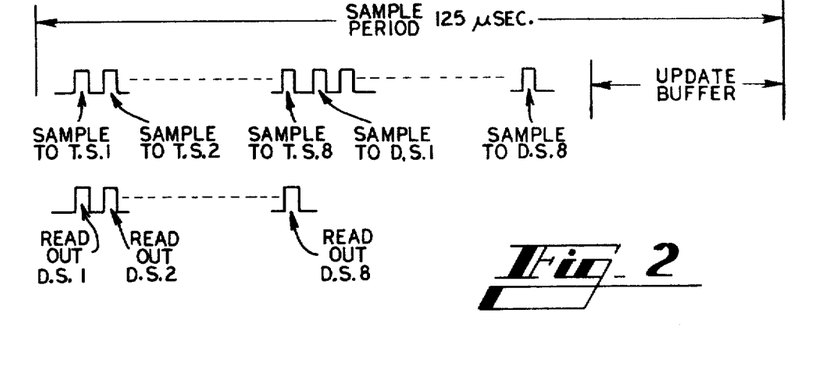
FIG. 2 is a timing diagram showing time slot allocation within a single sample period.

Before providing a more detailed description of the preferred embodiment, an overview of operation of the preferred embodiment will be presented in connection with FIGS. 1 and 2. It should be understood that conversion and multiplexing modules 18a–18h in the preferred embodiment include encoders/decoders commonly referred to as codecs. The preferred form of the present invention uses conventional integrated circuit companding codecs of the type MK5116 currently manufactured by Mostek Corporation of Carrollton, Tex. This type of codec is specifically designed for time multiplexed systems and provides the ability to read out converted data serially at a rate that is very fast with respect to the sampling rate. Thus it is possible to serially read out an entire eight bit digital representation of an analog sample in a very small portion of the sampling period when only speech signals are of interest. In the preferred form of the present invention, 3.5 kilohertz is considered an upper usuable limit on the speech range and therefore a sampling rate of eight kilohertz is used. This provides a sampling period of one hundred twenty-five microseconds.

With codecs of the type used in the preferred embodiment, a complete eight bit data word may be serially read from the digital output of the codec in a few microseconds. Digital data to be converted into analog samples may be read into the A/D side of the codec at approximately the same rate.

It will thus be appreciated that the system shown in FIG. 1, under the control of CPU 15 effects a time divisional of multiplexed sharing of data buses 20 and 29 in order to transfer digitized speech signals to and from dictate stations 16 and transcribe stations 17.

A representation of the multiplexing scheme of the preferred embodiment appears in FIG. 2 wherein a complete sample period is shown with pulses indicating the time period set aside for reading out and writing into converter modules 18 and 28.

Note that eight time slots are provided at the beginning of the represented sample period and each time slot is dedicated to both providing a digital sample upon playback to one of transcribe stations 17 and for reading digital samples from dictate stations 18.

As will be explained in further detail later, it will be apparent that under most normal operating conditions the apparatus will not be transferring data to each station during each time slot and that certain of the dedicated time slots will not be used in any given sample period.

Following the first eight time slots, a second sequence of eight time slots is dedicated to providing digital samples to dictate stations 16 for each of these dictate stations which currently requires playback of recorded dictation for review. This arrangement leaves one-third of the sampling period available for updating buffers 21 and 30. It will of course be understood that periods in excess of eighty microseconds are available in each sample period during which data transfer between RAM 11 and disc memory 12 may take place under control of CPU 15.

For any given dictate station providing digitized output when the operator is recording dictation, it should be understood that the following sequence takes place. Each time the time slot for reading out of the particular dictate station occurs, an eight bit word is read out of the converter module 18 associated with that dictate station onto data bus 20 into buffer 21. During subsequent transfer of data from buffer 21 to RAM 11, CPU 15 assigns this particular sample an appropriate address within RAM 11 which, under CPU control is known to be the next contiguous address in the portion of RAM 11 currently being used for that particular piece of dictation. Thus it will be appreciated that incrementing of an address counter within processor 15 is the analog of advancement of tape in a conventional dictation recording and transcribing system.

It should be further understood that under the control of a routine resident in CPU 15 referred to herein as the "memory controller", a record is maintained of available portions of RAM 11 and disc memory 12 which may be used for the recording of dictation. Thus, if a particular available segment of RAM 11 becomes filled while dictation continues, an indication will be generated in map memory 40 that that particular piece of dictation continues elsewhere.

It is the use of map memory 40 in conjunction with a particular predetermined jump instruction which may be recorded in RAM 11 which provides the advantageous novel features of the present invention.

During playback for transcription at a transcribe station 17 or review at a dictation station 16, data is read out of portions of RAM 11 into buffers 30 and 21 and provided to D/A conversion blocks 28 and 18.

As RAM 11 becomes filled with the new dictation or the dictation in RAM 11 is read out, data will be transferred between RAM 11 and disc memory 12 during available portions of the sampling period cycles.

In the preferred embodiment, RAM 11 comprises approximately ninety-six kilobytes which corresponds to approximately twelve seconds of recorded dictation.

In a manner which will be described further below in connection with FIG. 4, CPU 15 continually scans lines 26 and dictate stations 16 and the lines 32 from transcribe stations 17 in order to ascertain the particular function currently being commanded by the user of each station.

Figure 3:
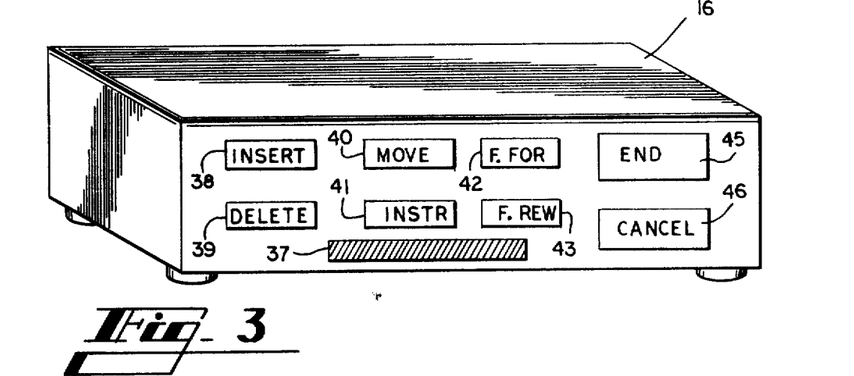
FIG. 3 is a pictorial view of a control panel for a dictate station used in the present invention.

Turning next to FIG. 3, operation of the controls of each of dictate stations 16 will be described.

A pictorial view of a control panel for one of dictate stations 18 is shown in FIG. 3. It is to be understood that in addition to the momentary switches shown on the front panel of the dictate station of FIG. 3, a conventional dictation hand set (not shown) including a microphone, a speaker, dictate, rewind, and listen controls will also be provided at each of dictate stations 18.

The front panel controls for the dictate station include a display 37 used for indicating the present status of an instruction sequence. It is preferable to embody display 37 as a LED dot matrix array but any suitable display device may be used to embody display 37.

The front panel controls of the dictate station are embodied by momentary switches labeled as shown in FIG. 3. These controls include insert control 38, delete control 39, move control 40, instruction (INSTR) control 41, fast forward (F.FOR) control 42, fast rewind (F.REW) control 43, end control 45 and cancel control 46. It will therefore be appreciated that the eight front panel controls, in addition to the three controls (not shown) on the dictation hand set provide eleven distinct control signals which may be encoded as a four bit word on control lines 26a (FIG. 1).

The operation of the preferred embodiment in response to the controls shown in FIG. 3 will be explained in detail hereinbelow in connection with FIGS. 6 and 7. At this point, the proper control sequence to effect desired insertions, deletions, and movements of dictation segments will be described.

In the operation of the conventional dictate, rewind, and listen controls (not shown) the dictator using dictate station 16 would operate these controls in the same manner as conventional dictation recording equipment is operated.

The operation of fast forward control 42 and fast rewind control 43 provides the same results as conventional analogous controls in conventional systems.

To record an instruction at any point in the dictation, the dictator operates instruction control 41, dictates the instruction and then operates end control 45. As will be explained in further detail hereinbelow, this sequence of control operations causes the most recently dictated instruction to be played back first when the transcriber proceeds to transcribe the particular piece of dictation and removes the instruction from the normal playback sequence. If the dictator then continues to dictate, upon reviewing the section of dictation including the break at which the instruction was inserted, the instruction is not played back. The dictator may review the recorded instruction prior to operation of end control 45.

If the dictator has recorded a previous segment of dictation and wishes to insert additional dictation within the previously recorded segment, the following sequence is used. The dictator reviews the recorded dictation segment until he or she reaches the point at which the insert is desired. Then insert control 38 is then operated. The dictator may proceed with recording the insert and, upon satisfactory completion of the insert, operates end control 45. When this sequence has been accomplished, playback for review or playback by the transcriber will cause a continuous playback of the first portion of the previously recorded segment, followed by the insertion, followed by the remainder of the previously recorded dictation segment.

To delete a portion of a previously recorded dictation segment the dictator reviews the segment until the beginning point of the deleted excerpt is located. At that point the delete control 39 is operated and the dictator may continue to listen to the previously recorded segment until the end of the excerpt to be deleted is reached. When this is accomplished the dictator operates end control 45. When this sequence has been accomplished, playback for review or transcription will immediately jump from the point at which the deletion began to the point at which the deletion ended during playback so that the deleted portion will effectively disappear from the playback sequence without any pause or equivalent length of blank tape being presented to the listener.

To move a segment of previously recorded dictation, the operator first defines the segment of dictation to be moved by reviewing until the beginning of the segment is located. At this point, operation of move control 40 defines the beginning of the segment. The operator may then continue to review dictation until the end point of the segment to be moved is located; at which point end control 45 is operated. This sequence of control operations defines the block to be moved.

With a block so defined, the operator of the station may continue to operate the controls in any desired sequence until the point at which the previously defined block is to be relocated is reached. For example, the operator may continue to review dictation or may rewind into previously recorded dictation in order to locate the point at which it is desired to relocate the defined block. When the point at which the defined block is to be inserted is reached, the operator then operates two controls in the sequence of: move control 40; insert control 38. Upon completion of this sequence of control operations, playback for review or transcription will delete the defined block from its previous location and cause the defined block to be reproduced at the new location at which the "move, insert" control sequence was made.

If at any point during a control instruction sequence, the dictator changes his or her mind, cancel control 46 will eliminate the previously begun control sequence.

Under the control of CPU 15 (FIG. 1) an illegal sequence of instruction control operations will cause an appropriate message to be displayed in display 37. For example, if delete control 39 is operated indicating the beginning point of a segment to be deleted, and then review of a segment continues until an end point is reached, followed by an operation of move control 40 by the operator, a message will be displayed in display 37 indicating that the beginning of a block for deletion has previously been defined and that the user should either operate end control 45 to complete the deletion process or cancel control 46 if no deletion is desired.

Also, operation of end control 45 without previous operation of one of keys 38, 39, 40, or 41 will cause a message to be displayed in display 37 indicating that the user is attempting to define the end of a dictation segment and inquiring (in abbreviated terms) whether this is desired. If the operator does in fact wish to define the present location of the reviewed dictation as the end of a piece of dictation, a second operation of end key 45 causes signals to be sent to CPU 15 indicating that the dictator has completed an entire piece of dictation.

Figure 4A:
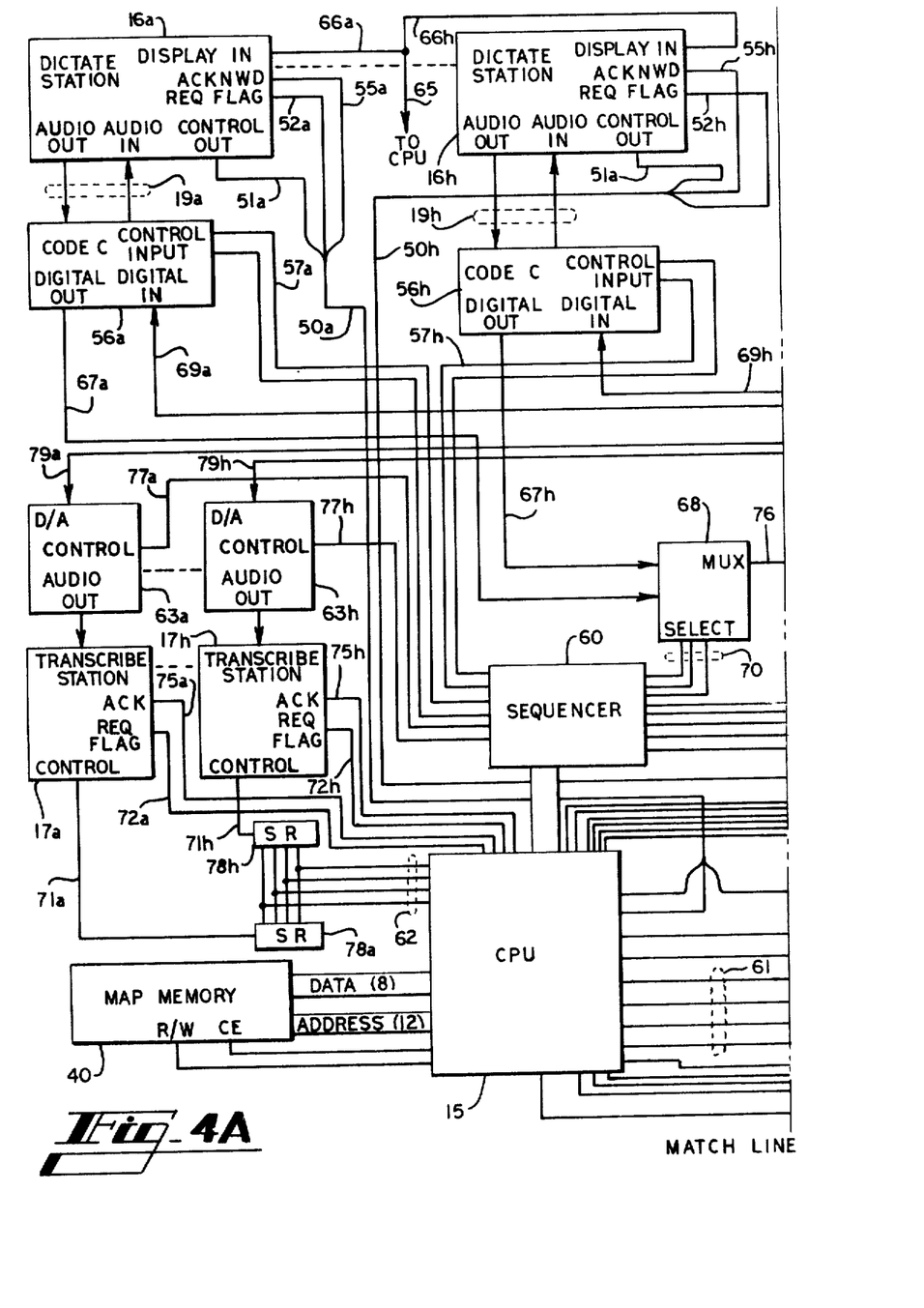
FIGS. 4A and 4B are a schematic diagram of the preferred embodiment of the present invention.
Figure 4B:
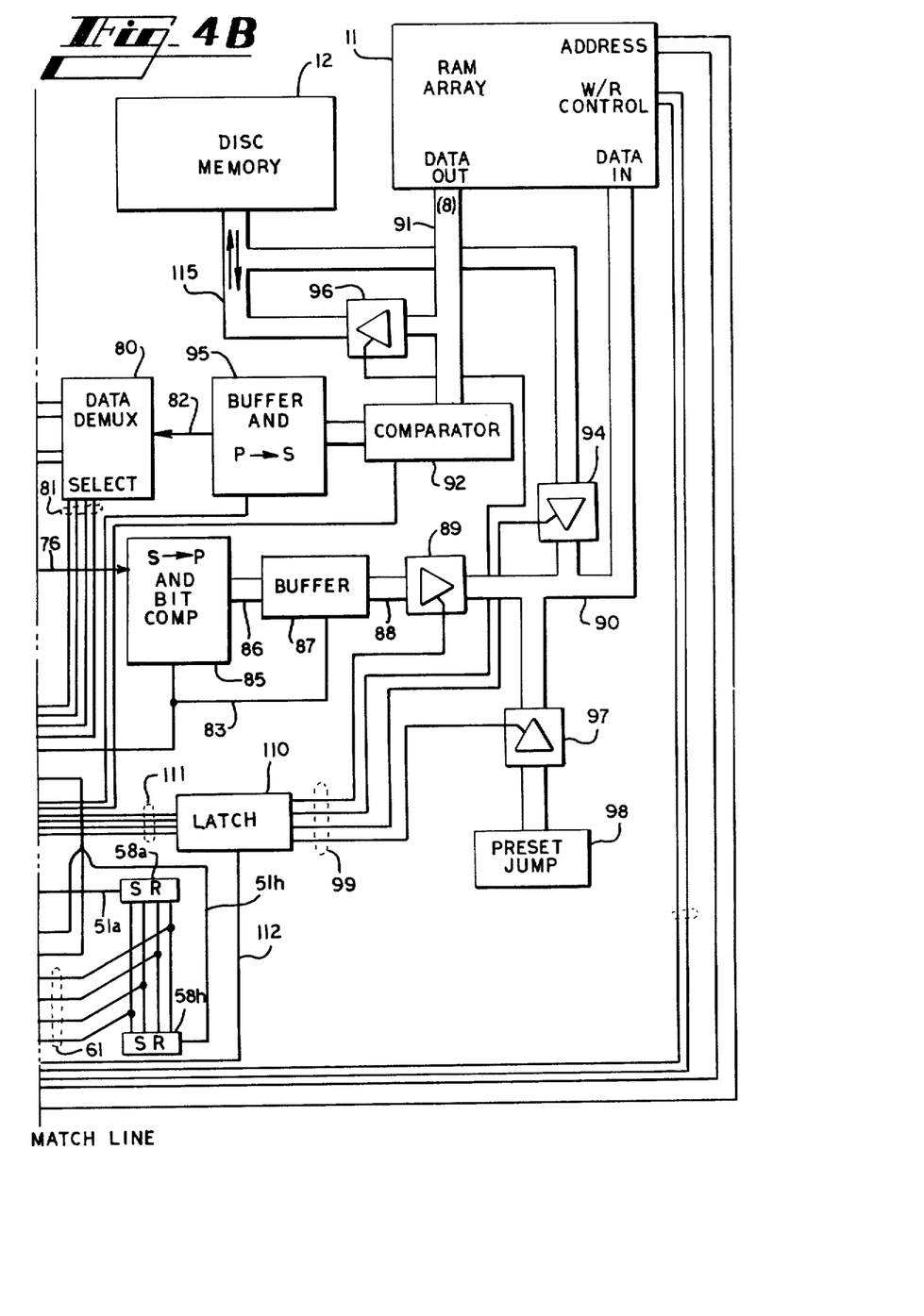

Turning now to FIG. 4, a more detailed schematic of the preferred embodiment of the present invention is shown. Portions of FIG. 4 which correspond directly to blocks of the diagram of FIG. 1 are referenced by the same numerals and elements without direct corresponding blocks on FIG. 1 are indicated by additional reference numerals.

As may be seen from FIG. 4, each of dictate stations 16a–16h is connected to CPU 15 via a three line control bus 50a–50h, respectively. It may also be seen that each of the three line control buses 50 comprises a control output line 51 for carrying, serially, four bit words indicative of a particular one of the controls at the dictate station which has been operated.

Lines 52 and 55 are hand shaking lines with line 52a being designated as an acknowledge. It should be appreciated that line 52a is connected to a flag within dictate station 16a which becomes set when a new, previously unacknowledged, instruction control has been operated by the operator of the dictate station. When CPU 15 scans to line 52a and detects that the flag is set, an acknowledgement instruction is sent back from the CPU along line 55a which causes the four bit word identifying the newly operated control to be read out on line 51a and also clears the request flag connected to line 52a. Thus it will be appreciated that the preferred embodiment only transmits control signals along line 51a when there is a change in the control signal presently being provided by the operator of the dictate station. In the absence of a signal condition on the request flat line 52a, the CPU simply moves on to the next one of lines 52 for the next succeeding dictate station and presumes that the previously acknowledged control function is still being provided by the operator of the dictate station.

The two-way audio communication links 19a–19h are shown as individual audio lines in FIG. 4. These lines are connected to the audio input and outputs of codec 56a–56h. Each of codecs 56a–56h is connected to sequencer 60 via a control bus 57 which provides control signals to the codec controlling in a known manner: the flow of digital signals into and out of the codec; the flow of audio signals on two way link 19; and timing controls for the D to A and A to D converters. As may be seen from FIG. 4, buses 50 from dictate station 16 have their lines 52 and 55 directly connected to a port of CPU 15 and control output lines 51 are connected to a four bit shift register 58 associated with the respective dictate station acting as a serial to parallel converter for the control words on line 51.

The outputs of shift registers 58 are provided to a four bit common bus 61 to an input port of CPU 15. Since dictate stations 16 are scanned by CPU 15 in a time division scheme, only one four bit control word will be present on bus 61 at any given time and therefore all control output lines 51 from dictate stations 16 may share a common four bit input 61 to CPU 15.

In an analogous manner, four bit bus 62 accepts outputs from four bit shift register 58 from control output lines 71 from transcribe stations 17. Request flag lines 72 and acknowledge lines 75 operate in the same manner as lines 52 and 55, respectively, associated with dictate station 16. Thus it will be appreciated that all changes from the controls operated by transcribers at transcriber station 17 are also scanned in a time division arrangement with the control signals being provided on a common input bus 62 to CPU 15.

An asynchronous data link is provided on a single line 65 to a UART (not shown) interfaced with CPU 15. Line 65 has eight drops denoted 66a–66h attached thereto, each of which is attached to one of dictate stations 16. Line 65 is used to transmit to an addressable UART in each of dictate stations 16a–16h the contents for display 37 (FIG. 3) to provide messages to the users of the dictate stations. It will be appreciated that the relatively slow transmission via a single line to addressable UARTs with each of dictate stations 16 may be accommodated in the preferred embodiment due to the relative infrequency of communication on line 65.

Turning now to the data portions of the preferred embodiment which carry, process, and store digital data corresponding to digitized dictation signals; it will be appreciated that each of codecs 56 has a single serial data line 67 attached thereto which is connected to data multiplexer 68. Multiplexer 68 has a three bit bus 70 controlling its select inputs so it will be appreciated that multiplexer 68 is an eight line to one line multiplexer with the output being provided on line 76.

On the output side of the memory, a one line to sixteen line data demultiplexer 80 provides eight outputs of lines 69a–69h to the digital inputs of codecs 56 and eight outputs on lines 79a–79h as inputs to D to A converters 63 associated with transcriber stations 17.

Data demultiplexer 80 has a select input port controlled by a four bit bus 81 in order to effect steering of the data from input line 82 to one of the sixteen output lines 69 and 79.

Referring to FIGS. 2 and 4, it will be appreciated that the signals on control buses 70 and 81 operate multiplexer 68 and demultiplexer 80, respectively, in the following fashion. During the first eight time slots of a sample period as depicted on FIG. 2, data demultiplexer 80 will be providing eight bit digital words to D to A converter 63 along lines 79a–79h, respectively. During the same first eight time slots, multiplexer 68 will be reading outputs from lines 67a–67h onto line 76.

During the next eight time slots, multiplexer 68 will be inactive while data demultiplexer 80 will be providing eight bit words along lines 69a–69h to the digital to analog sections of codec 56.

In tracing digitized signals from line 67 provided by codec 56 in response to spoken dictation at dictate station 16, it is to be understood that the first operation on the serial data on line 76 is a serial to parallel conversion and bit comparison provided by block 85. The output of block 85 appears as eight bit parallel words on bus 86 which are provided as inputs to buffer 87. The output of buffer 87 is provided on eight bit bus 88 to the input of a three state buffer 89, the output of which is connected to a data input bus 90 as an input to RAM array 11.

The data output bus from RAM array 11 appears as 91 in FIG. 4. Bus 91 is connected to a comparator 92 which, as will be explained further hereinbelow, responds each eight bit word coming out of bus 91 to buffer and parallel-to-serial converter module 95 to test for the presence of a predetermined jump instruction code. The output of buffer and parallel-to-serial converter 95 is provided serially on line 82 to data demultiplexer 80.

Buses 90 and 91 are also buffered by tristate buffers 94 and 96. Additionally, a tristate buffer 97 is connected to bus 90 which, when activated, will provide an eight bit word contained in a one by eight bit read only memory 98 designated "preset jump".

It should be appreciated that read only memory 98 is best embodied by a series of dedicated lines which are either grounded or tied to a logical one voltage level in order to provide a particular eight bit word to buffer 97.

Tristate buffers 89, 94 and 96–97 have their tristate control inputs controlled by a four bit bus 99, the state of which is the output of a four bit latch 110. Latch 110 latches the contents of a four bit bus 11 which is connected to CPU 15 upon receiving an appropriate strobe signal on line 112.

It will be appreciated by those skilled in the art that the control word on bus 99 controls which of tristate buffers 89, 94 and 96–97 are active and which have their outputs in high impedance state so as to control the flow of data on buses 90 and 91.

A bidirectional bus 115 connects disk memory 112 to buses 90 and 91. Thus it will be appreciated that the tristate buffers under control of latch 110 determine the data paths among buses 90, 91 and 115. For example, when it is desired to write data out of RAM 11 into disk memory 12, buffer 94 will have its outputs in a high impedance state and buffer 96 will have its output in a low impedance state thus connecting bus 91 to bus 115. Similarly, when more data is needed for RAM 11 from disk memory 12, buffer 96 will have its outputs in high impedance state and buffer 94 will be activated to connected bus 115 to bus 90. Also for writing from disk memory 12 into RAM array 11, buffers 89 and 97 will have their outputs in a high impedance state.

As noted hereinabove, one of the unique features of the present invention in the field of dictation is the provision of map memory 40 and the contents thereof provided in response to operation of controls at dictate station 16.

Map memory 40 contains pairs of words, each word comprising three eight bit bytes, which control the sequence of playback to dictate stations 16 and transcribe stations 17. The preferred embodiment of the present invention uses the following arrangement to effect a change of sequence in playback to the listener of the recorded digitized speech signals. A dedicated eight bit jump code is defined for the system. In the preferred embodiment the dedicated eight bit jump code is eight binary ones (11111111) and thus correspond to the largest positive output of the analog to digital converters of codecs 56.

The preferred embodiment operates as follows. At any point in the recording of dictation at which any other digitized sample is to be read out other than the next sample with a contiguous address from RAM array 11, the eight bit, all ones jump code is recorded at the location in RAM memory 11 at which the jump is to take place. It will therefore be appreciated that if the jump code occurs as an output of one of codecs 56, one bit must be changed before the word is written into RAM 11 as a normal digitized sample.

This is the function of serial-to-parallel and bit comparator 85 which will be explained in connection with FIG. 5.

Upon detection of the jump code by comparator 92 during playback of digitized samples, a signal is sent to CPU 15 indicating the presence of the jump code. CPU 15 then interrupts the normal sequence of playback for that particular dictate or transcriber station and scans map memory 40 for an address corresponding to the address at which the predetermined jump signal was located. Upon detecting such an address number stored in map memory 40, the second word of the word pair having said address as the first word is then loaded into an address counter for that particular piece of dictation, thus effecting a change in the playback sequence.

Thus it will be appreciated that when the predetermined jump code is detected in a stream of output words from bus 91 by comparator 92, CPU 15 will scan map 40 to see where the next sample is located that is to be played back to a particular listening station listening to that particular piece of dictation.

Figure 5:
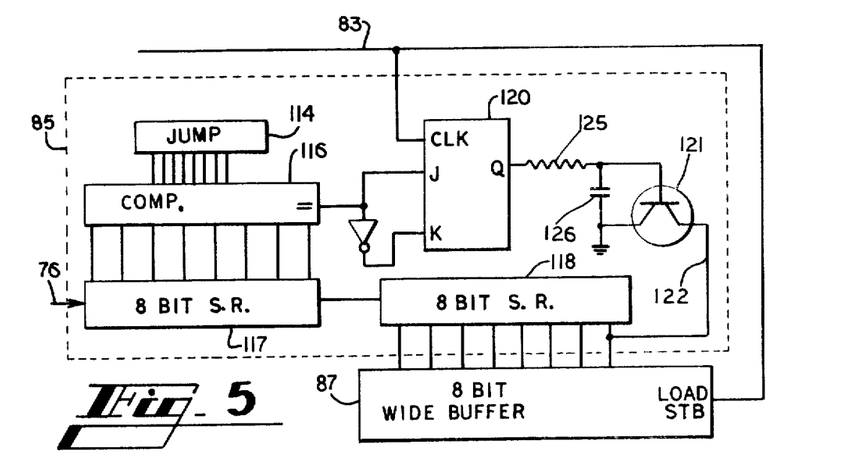
FIG. 5 is a schematic of a comparator and complementing circuit used in the present invention.

Turning now to FIG. 5, a preferred embodiment of serial-to-parallel and bit comparator 85, which prevents the inadvertent recording of the predetermined jump signal, is shown. The eight bit jump signal is located in a one by eight read only memory 114 which corresponds in construction to the previously described one by eight read only memory 98. The eight bits from ROM 114 are provided as an input to comparator 116 which has as its other input the parallel outputs of an eight bit shift register 117 having as its serial input the data stream from line 76.

Line 83 as shown in FIG. 5 corresponds to line 83 shown in FIG. 4 and will be understood to include a positive going strobe signal for writing the parallel outputs of an eight bit shift register 118 into eight bit buffer 87.

It is to be understood that line 83 will provide a positive going strobe signal to buffer 87 at appropriate intervals after eight bits representing a single eight bit word from one of codecs 56 has been written into shift register 118. It follows therefrom that another eight bit word will, at the time that line 83 provides a strobe, be present in eight bit shift register 117. It should be understood that lines providing clocking signals to shift registers 117 and 118 are not shown.

From FIG. 5 it will be appreciated that, at any time the contents of shift register 117 is the predetermined jump instruction resident in eight bit ROM 114, the equal output 119 of comparator 116 will be a logical one. It may further be appeciated that the positive going strobe on line 83 which occurs at the time a complete eight bit word is resident in both of shift registers 117 and 118 occurs, the clock input for positive edge triggered JK flip-flop 120 will also be strobed. Since the asserted form of the output on line 119 is provided to the J input and the negated form of line 119 is provided to the K input of flip-flop 120, flip-flop 120 will be set only upon detection of the presence of the predetermined jump code in shift register 117 at the time that a strobe is provided on line 83. Under this condition, it is to be understood that the word present in shift register 117 represents a normal occurrence of the predetermined jump code on line 76 from one of codecs 56.

When this condition is detected under the circumstances set forth above, the output of flip-flop 120 goes to a logical one.

When the output of flip-flop 120 is a logical one, an RC network comprising resistor 125 and capacitor 126 attached to the base of transistor 121 begins to drive resistor 121 into saturation. It is to be understood that the time constant for the combination of resistor 125 and capacitor 126 is selected so that transistor 121 will not saturate during the strobe on line 183 which initially sets flip-flop 120. However, during the writing of the next eight bits into shift registers 117 and 118, transistor 121 will become saturated pulling line 122 to a logical zero level.

Under these conditions, the word then present in shift register 118 which will be understood to represent the occurrence of the predetermined jump code. This word will be strobed into buffer 87 but the basic ground condition on line 122 will complement the least significant bit, thus preventing writing of the all ones predetermined jump code into buffer 87. Assuming that the next word in shift register 117 is not the predetermined jump code, flip-flop 120 will be cleared upon the same occurrence of the strobe on line 83 which writes the 11111110 word into buffer 87 and thus capacitor 126 will have ample time to discharge prior to the next strobe on line 83 writing the next word into buffer 87.

Thus it will be appreciated that the serial-to-parallel and bit comparator 85 shown in FIG. 5 prevents the inadvertent writing of the predetermined jump code into RAM array 11 if the predetermined jump code occurs as an output of one of codecs 56.

Figure 6A:
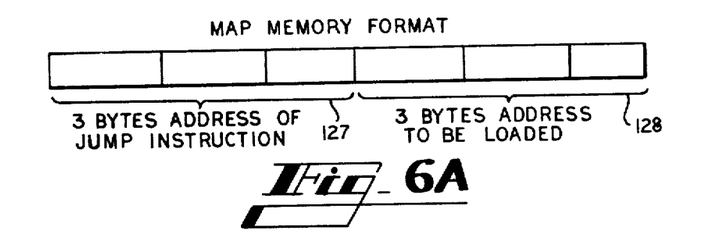
FIG. 6A is a block diagram of the format of the map memory of the preferred embodiment.

Turning now to FIG. 6A, the structure of memory map 40 will be explained.

It should first be understood that within the preferred embodiment, each piece of dictation which is defined as a unitary piece of dictation is limited to approximately thirty minutes. It will thus be appreciated that at a sampling rate of eight kilohertz, each so-defined thirty minute piece of dictation may occupy aproximately 14.4 megabytes of eight bit memory.

Thus it is to be understood that twenty-four bits are required to define an address within each thirty minute piece of dictation.

Therefore, within any given piece of dictation, three eight bit bytes are sufficient to define an address.

FIG. 6A shows the basic map memory format of a word pair in the map memory defining a change of sequence in response to detection of the predetermined jump code in RAM array 11. As may be seen from FIG. 6A, the first word 127 of a word pair in the memory map format comprises three eight bit bytes denoting the address within the particular piece of dictation at which the predetermined jump code is located. The second three byte word 128 of the word pair in the map memory denotes the address which is to be loaded into the address counter for that particular piece of dictation for the next sample to be reproduced after the address at which the predetermined jump code was encountered. Thus it will be appreciated that the map memory format comprises a word pair, each word comprising three eight bit bytes. The first word of the pair denotes the address of the predetermined jump code and the second word denotes the address to be jumped to during the playback sequence for a particular piece of dictation.

Figure 6B:
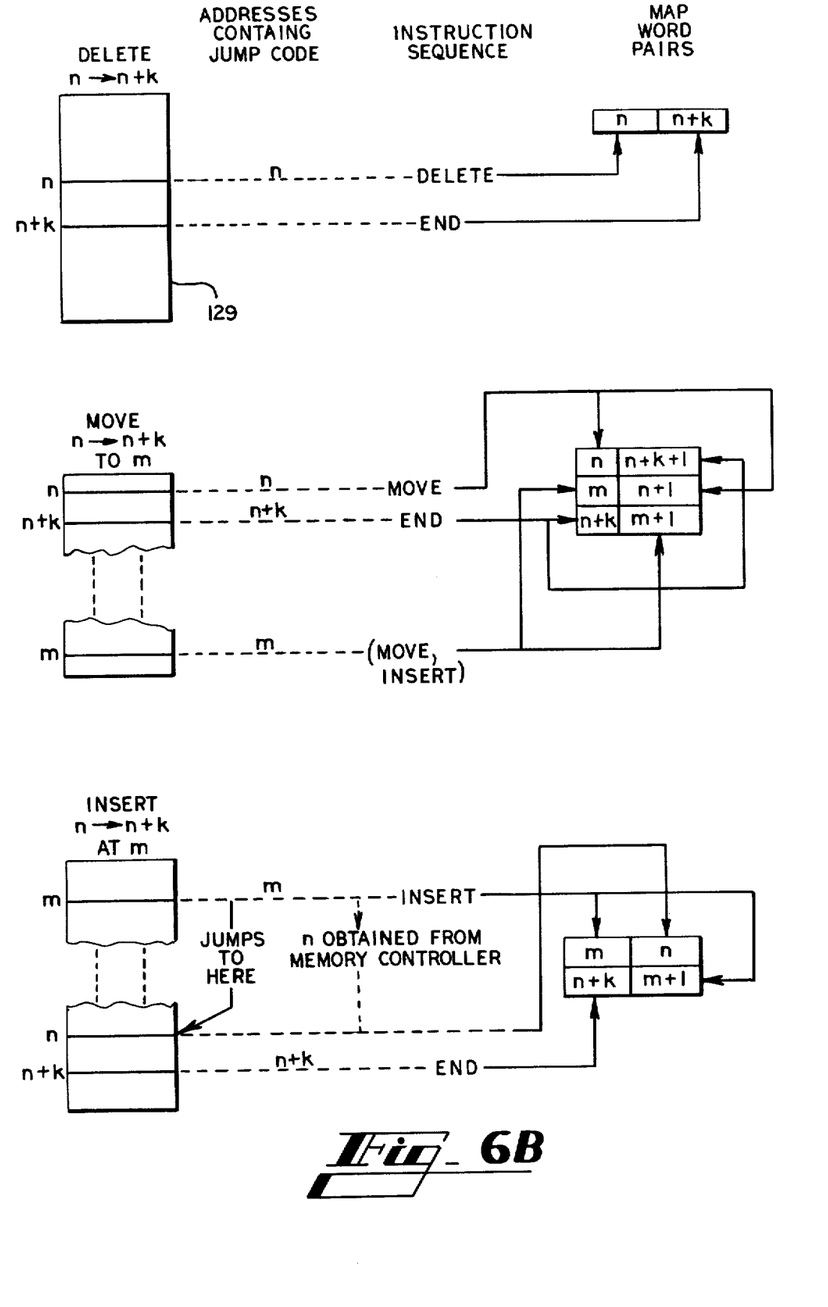
FIG. 6B is a diagram representing the memory, certain contents of the memory, the instruction sequence, and resulting words written into the map memory for certain control functions executed by the dictator.

Turning next to FIG. 6B, the writing of word pairs into map memory 40 in response to operation of control instruction keys 38-43 and 45 shown in FIG. 3 will now be explained. On FIG. 6B, the far lefthand column contains a block representation of a portion of RAM array 11 which may also include portions of disk memory 12 containing segments of dictation. The next righthand column denotes the addresses within the particular piece of dictation which contain the predetermined jump code. The next righthand column shows the instruction sequence corresponding to the sequence of operation of the control key shown in FIG. 3, and the far righthand column represents the the word pairs stored within map memory 40.

Deletion

Turning now to the upper portion of FIG. 6B, the code generated in map memory 40 in response to the deletion instruction sequence is shown. The represented operation is deletion of a portion of dictation contained in addresses n through n+k in response to the shown instruction sequence of operating delete key 39 (FIG. 3) when dictation has been reviewed to location n (within the particular piece of dictation), followed by review to location n+k, where end key 45 is operated.

As may be seen from FIG. 6B, the operation of delete key 39 when the address counter for the particular piece of dictation is pointing to address n, loads the predetermined jump instruction into address n as well as loading address n as the first word of one of the map word pairs. After review has occurred to location n+k, operation of end key 45 loads the address n+k as the second word of the word pair of map memory 40 corresponding to this particular deletion.

Thus it will be appreciated that during playback of the block 129 of memory representing this particular piece of dictation, the predetermined jump code will be detected by comparator 92 (FIG. 4) at location n. When this occurs, CPU 15 will go the map memory 40 and search until it finds the particular word pair having a first word corresponding to location n. Upon locating this word pair, address n+k will be loaded into the address counter for the particular piece of dictation and thus the portion of previously recorded dictation lying between memory locations n and n+k will be skipped, thus effectively deleting same from the playback sequence.

Move

In the middle of FIG. 6B the instruction sequence and a block diagram representing the memory for a particular piece of dictation is shown for a move instruction which corresponds to moving a block of dictation located between addresses n and n+k to location to m. As may be seen from FIG. 6B, a completed move instruction generates three word pairs in map memory 40. It is to be understood that initial operation of move key 40 (FIG. 3) sets aside appropriate space in map memory 40 for three word pairs. Upon review of dictation to location n followed by operation of move key 40, the address of location n is loaded into the first word of the first word pair of the three word pair segment shown and n+1 is loaded into the second word of the second word pair in map memory 40.

After the dictator has reviewed portions of dictation past address n, the dictator will come to address n+k which he or she wishes to define as the end of the block to be moved. As may be seen from FIG. 6, operation of end key 45 at this point causes address n+k to be loaded into the first word of the third word pair and address n+k+1 to be loaded as the second word of the first word pair.

As explained hereinabove, subsequent to defining the block to be moved by operation of the move and end keys, the dictator may then scan the dictation for the address m at which it is desired to insert the previously defined block. As shown diagrammatically in FIG. 6B, address m is subsequent to address n+k, but is to be understood that the defined block may also be moved to a previous address by a "rewinding" into a previously recorded portion of dictation. When the address m has been selected at which the defined block is to be inserted, operation of keys move and insert sequentially generates the remaining two words for the three word pairs in map memory 40. As is shown in FIG. 6B, address m is loaded as the first word of the second word pair and address m+1 is loaded at the third word of the last word pair.

In examining FIG. 6, it will now be appreciated the sequence in which dictation will be reproduced for review or transcription in response to the three word pairs for a move instruction shown in FIG. 6B. Assume in the example that address m is subsequent to address n+k in the normal addressing order of the system. Upon reproduction, digitized samples will be read out until address n is located which contains the predetermined jump code. Upon searching through memory map 40, CPU 15 locates the first word pair associated with this move instruction and loads address n+k+1 and continues sequential reproduction of digitized samples. Thus, the first word pair for the move instruction shown in FIG. 6B causes the defined block to be skipped when first encountered. Note also that address n+k which also contains the predetermined jump code was initially skipped since the jump from address n was to address n+k+1.

Reproduction continues until address m is reached at which another predetermined jump code is located. Going to the map, the second word pair indicates that when address m is reached, address n+1 should be loaded for the next sequential segment of dictation to be reproduced and thus, the moved block is provided to the dictator for review or the transcriber for transcription. Upon reaching address n+k where another jump code is located, the last word pair for the move instruction shown in FIG. 6B causes the order of reproduction to jump to address n+1 thus continuing normal sequential reproduction.

It will be appreciated by those skilled in the art that while the sequence will be different, the net result of moving a block of dictation between addresses n and n+k to a new location m will operate in the same manner if address m actually precedes the moved block, n through n+k. Under these circumstances the first jump code encountered would be the jump code at address m which would transfer the sequence to address n+1 (second word pair) and thus begin reproduction of the moved block at the location m. When the next jump code at address n+k is reached, the reproduction sequence jumps to address m+1 thus continuing normal sequential reproduction after the moved block has been reproduced. Finally, the jump code at address n will be reached and the block will be skilled to address n+k+1. Thus it will be seen that the same map word pairs shown in FIG. 6B for a move instruction sequence cause proper transfer for reproduction sequence without regard to whether the actual address m to which the block n through n+k is moved precedes or follows the actual location of the block in memory in the normal addressing scheme.

Insert

In the lower portion of FIG. 6B, the instruction sequence and the map word pairs for an insert operation are shown. An insertion of a block of dictation to be generated at addresses n through n+k at an address m in a segment of previously recorded dictation is illustrated.

Assume that the dictator has reviewed dictation until point m is reached at which point it is desired to make an insertion to the previously recorded dictation. Note that an insert operation generates two map word pairs in map memory 40. At location m insert key 38 (FIG. 3) is operated and the system loads address m as the first word of the first word pair and address m+1 as the second word of the second word pair. Upon receipt of an initial insert instruction, the CPU obtains an address n from the memory controller indicating that beginning at address n, there is an available block of memory for the recording of dictation. The obtaining of address n from the memory controller by the CPU also causes address n to be loaded as the second word of the first word pair. The dictator proceeds to dictate the insert which is located at address n and subsequent sequential addresses. When the insert is completed at address n+k, end key 45 (FIG. 3) is operated and, in response thereto, address n+k is loaded as the first word of the second word pair.

From the foregoing description of how reproduction sequences are altered in response to the map word pairs and map memory 40, it will be apparent that upon reaching address m at which the predetermined jump code is located, the listener will immediately begin to hear the newly dictated insert beginning at address n. When address n+k is reached, at which a second occurrence of the predetermined jump code is located, transfer of the sequence is back to m+1 and thus the listener hears an uninterrupted sequence of reproduced dicatation comprising: the portion of recorded dictation up to address m; the newly dictated insert between n and n+k, followed by the remainder of the prerecorded dictation beginning at m+1.

Figure 7:
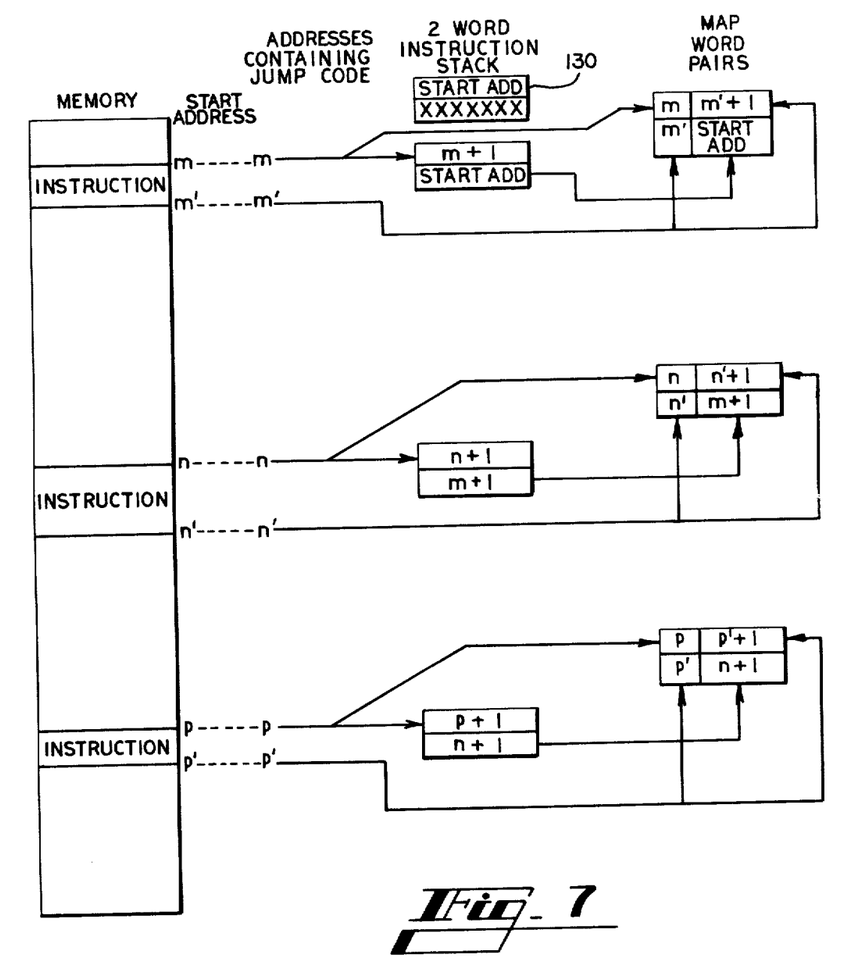
FIG. 7 is a diagram representing the memory, contents of a dedicated stack, and words generated in the map memory upon the recording of instructions by the preferred embodiment.

Turning next to FIG. 7, the response of the preferred embodiment to the recording of instructions by the dictator is illustrated. It is to be understood that for each piece of dictation defined by the memory controller, a two word instruction stack is provided in map memory 40 of which each word consists of three eight bit bytes corresponding to an address within the particular piece of dictation. As is illustrated in FIG. 7, the recording of an instruction, similar to an insert operation generates two map word pairs in the map memory 40.

The map word pairs are used to both skip the instruction during normal reproduction of the dictation and to insure the above noted last-in-first-out (LIFO) reproduction of all the instructions in a piece of dictation as the first recorded segments heard by the transcriber when transcription of any piece of dicatation begins.

The two word instruction stack illustrated in the middle column of FIG. 7 shall be understood to be a push down stack, as illustrated, and it is loaded by the following rule. Upon beginning a piece of dictation, a starting address as illustrated at block 130 is provided by the memory controller as a starting address for that particular piece of dictation. As noted hereinabove, an instruction may be recorded at any point in the dictation by operation of instruction (INSTR) key 41 (FIG. 3), dictating the instruction, and then operating end key 45.

The loading of the two word instruction stack for a piece of dictation is as follows, at any given address m at which instruction control 41 is operated, address m+1 is loaded into the top of the stack and the word formerly in the top of the stack is pushed down. It is to be further understood that upon beginning reproduction of any piece of dictation by a transcriber, the starting address for the reproduction sequence is always obtained from the top word in the stack. It is to be understood that if cancel key 46 is operated after instruction key 41 has been operated, the stack pops back up to retain its previous configuration. Thus it will be appreciated that the memory is arranged so that a third word of the stack is present at the bottom but, is not illustrated in FIG. 7 for the sake of clarity. The only use made of the third word in the instruction stack is to retain the previous second word in the event an instruction is begun and cancelled prior to operation of end key 45.

What is illustrated in FIG. 7 is a block of dictation containing three instructions. The instructions appear between addresses m and m', n and n', and p and p'. As is shown in the second from the lefthand column of FIG. 7, the above noted addresses (which are the addresses at which the insert and end keys are operated) each contain the predetermined jump code. From the illustration of FIG. 7 it will be appreciated that in a very simple operation of generating two map word pairs and operating the two word instruction stack as described hereinabove, the LIFO reproduction of all of the instructions at the beginning of dictation playback is accomplished. Upon operation of the instruction key for the first time at address m, the jump code is written into address m, address m+1 is loaded into the top of the instruction stack pushing down the starting address defining the beginning of the dictation segment, and address m is loaded as the first word of the first word pair.

Upon completing the instruction at point m', operation of end key 45 causes address m' to be written as the first word of the second word pair, m'+1 is written as the second word of the first word pair, and the bottom of the two word instruction stack (which now contains the starting address) is written as the second word of the second word pair.

As dictation commences, the dictator reaches a second point at address n at which it is desired to provide a second instruction. Operation of instruction key 41 (FIG. 3) at address n loads address n+1 into the top of the stack and address n as the first word of the first word pair. Upon completion of the instruction at n', operation of end key 45 writes the predetermined jump code at location n', causes address n'+1 to be written as the second word of the first word pair, and address n' as the first word of the second word pair. Also in response to the operation of the end key, the bottom word in the instruction stack (m+1) is loaded as the second word of the second word pair.

Following the two previous examples, it will be appreciated that the recording of an instruction between locations p and p' generates the two word pairs shown in the bottom righthand portion of FIG. 7 and leaves the instruction stack in the state shown.

Recalling that the top word in the instruction stack is always the first address for the reproduction sequence, it will now be appreciated that when transcription is begun, the instructions will be reproduced in the reverse order in which they were generated and then the normal dictation will begin to be reproduced. From FIG. 7 it will be appreciated that the reproduction sequence begins at address p+1 since this is the top word in the instruction stack. Thus the first segment of recorded dictation reproduced is the last generated instruction.

When address p' is reached the predetermined jump code causes the normal scanning of the map to take place. As may be seen from the map word pairs column of FIG. 7, the jump code at address p' points to address n+1 and thus the second instruction is reproduced to the transcriber. Reproduction of the second instruction continues until address n' is reached at which point a second search of the map proceeds. The word pair having n' as its first element points to address m+1 and thus the first instruction is reproduced as the third element of dictation heard by the transcriber. It will therefore be appreciated that the instructions illustrated in FIG. 7 are in fact reproduced on the last-in-first-out basis.

Consider now that the transcriber proceeds with listening of dictation through the end of the first instruction m'. The predetermined jump code at address m' is encountered and the map memory points to the starting address. Thus, the normally dictated segments of dictation become audible to the transcriber. When address m is reached after the first portion of the normal recorded dictation is heard, the jump code is encountered and the map is searched until it finds the word pair pointing to address m'+1 which skips the first instruction during this portion of the playback sequence. Thus the second block of dictation will be reproduced in a normal fashion until address n is reached which contains the jump code. The map memory points from address n to address n'+1 and thus skips the second instruction. In a similar manner, the instruction between address p and p' is also skipped and therefore once the instructions have been reproduced in a LIFO fashion at the beginning of transcription, they are skipped during subsequent reproduction of the normal recorded dictation.

From the foregoing description it should be appreciated that when the dictator uses an embodiment of the present invention, that an end of dictation segment signal may be selectively provided in a conventional manner from a dictate station (not shown). This will cause a jump signal to be written at the location corresponding to the end of the segment of dictation, for example, a complete letter, and a word pair to be written into memory map 40 indicating that the jump from this position should go to a routine for generating a tone or other indication to the transcriber that the end of the present piece of dictation has been reached. Also this will stop sequential addressing of the memory.

Furthermore, from what is shown in the foregoing portions of this specification, it will be apparent that it is desirable to write a predetermined code which may be considered a "reverse jump code" at locations corresponding to the second elements of the map word pairs shown in FIG. 6B. When these are encountered when the dictator is providing a signal corresponding to a conventional rewind signal, the sequence of addresses in the address counter will be augmented according to jumping from the second element of each map word pair to the first element of each map word pair so that the reverse sequence indicated by the map word pairs will be followed.

From the foregoing it will be appreciated that the preferred embodiment of the present invention accomplishes the objects set forth hereinabove by providing a dictation system in which a control means enables the originator of dictation to change the recorded dictation that can subsequently be heard as final dictation by a transcriber, the control means being selectively operable by the originator in connection with the originator listening to a portion of recorded dictation to cause the portion to be deleted from the final dictation, to be replaced, preceded, or followed by new dictation of the same or different length in the final dictation, or to be placed in a new location relative to other portions of the recorded dictation in the final dictation.

In particular, it will be appreciated that to enable a portion of recorded dictation to be deleted from the final dictation the transcriber can hear, the dictation system includes an arrangement for reproducing an audio output from a sequence of recorded signals including a first signal and a last signal. The system includes a selectively operable control means for providing another mode of operation in which the system will reproduce audio output from a different sequence of recorded signals between the times the first signal and the last signal are reproduced where the times for reproducing the sequences are different.

It will further be appreciated that the present invention provides a dictation recording and transcribing system in which the final dictation heard by the transcriber is reproduced in a contiguous, but rearranged, sequence from the sequence in which the recorded dictation was provided by storing recorded dictation signals in an addressable memory array and using an address counter for storing digitized forms of the signals provided by the originator in a first sequence of addresses, and further including a controller having a memory map selectively operable for storing a first jump code at a particular address N in the control map, and also for providing a first pointing vector stored in the control map in response to selective operation of an insert control. It will be appreciated that the system further stores a second sequence of digitized forms of the signals provided by the originator in a second sequence of addresses in the memory array, all the addresses being different from the first (original) sequence, and the controller is responsive to store a second jump code at a last address at the end of the second sequence in the memory array and to provide a second pointing vector in the control map in response to a selectively operable end of insert signal.

The disclosed apparatus is responsive to the two above-mentioned pointing vectors to jump the reproduced sequence for final dictation heard by the transcriber between the first signal at address N and the last signal at address N+1 to provide the reproduced audio form of the final dictation.

From the foregoing it will be appreciated that the preferred embodiment of the present invention accomplishes the objects set forth hereinabove and, give the teaching of this specification, other embodiments of the present invention will suggest themselves to those skilled in the art. Therefore the scope of the present invention is to be limited only by the claims below.

I claim:

1. A dictation recorder selectively operable for recording dictation during a recording mode and for playing back recorded dictation during a playback mode, comprising:

an addressable memory array for storing digital signals and jump codes in addressable locations;
an analog to digital converter for providing digital output signals in response to analog dictation input signals during said record mode;
a digital to analog converter for providing reproduced analog signals in response to being provided with digital signals from said memory array;
a control map memory for storing pointing vectors, each of said pointing vectors corresponding to an addressable location in said memory array at which a predetermined jump code is stored and a beginning address of a sequence of addressable locations;
a memory array address controller operative in said record mode for storing said digital output signals in a first sequence of addressable locations of said memory array;
said controller being selectively operable during said record mode for storing a first jump code at a particular address N within said first sequence of addressable locations and for providing a first pointing vector for storing in said control map memory in response to receipt of an insert signal provided by a dictator to indicate an insertion of dictation;
said controller being further responsive to said insert signal during said record mode for storing said digital output signals in a second sequence of addressable locations in said memory array, all addresses of said second sequence of addressable locations being different from all addresses of said first sequence of addressable locations;
said controller being further responsive during said record mode for storing a second jump code at a last address of said second sequence of addressable locations and for providing a second pointing vector for storing in said control map memory in response to receipt of an end of insert signal provided by the dictator to indicate the end of said insertion of dictation,
said second pointing vector corresponding to address N+1 in said first sequence of addressable locations.

2. A dictation recorder as recited in claim 1, wherein said controller is responsive during said playback mode to initially provide stored digital signals from said first sequence of addressable locations of said memory array to said digital to analog converter;
wherein said controller is further responsive during said playback mode to said first jump code at said address N in said first sequence of addressable locations to read said first pointing vector from said control map and to thereafter provide stored digital signals from said second sequence of addressable locations to said digital to analog converter; and
wherein said controller is further responsive during said playback mode to said second jump code at said last address of said second sequence of addressable locations to read said second pointing vector from said control map and to thereafter provide stored digital signals beginning with said address N+1 from said first sequence of addressable locations.

3. A recorded dictation playback apparatus for playing back a prerecorded sequence of dictation with a subsequently recorded insert sequence of dictation being reproduced at a preselected insertion point in said prerecorded sequence, comprising:

an addressable memory array for storing digital signals corresponding to said prerecorded sequence and said insert sequence in addressable locations;
a digital to analog converter for providing reproduced analog dictation signals in response to being provided with said digital signals;
means for storing a predetermined digital first jump code at an addressable location of said memory array corresponding to said preselected insertion point in said prerecorded sequence;
means for storing a predetermined digital second jump code at an addressable location of said memory array corresponding to the end of said insert sequence;
a control map memory for storing a first pointing vector corresponding to a beginning address of said insert sequence and for storing a second pointing vector corresponding to an address of a portion of said prerecorded sequence subsequent to said preselected insertion point; and
a memory array address controller operative to address said memory array and to provide stored digital signals corresponding to said prerecorded sequence to said digital to analog converter, said controller being responsive to said first jump code in said prerecorded sequence to read said control map memory to obtain said first pointing vector to address said memory array, and to provide stored digital signals corresponding to said insert sequence to said digital to analog converter, and said controller being responsive to said second jump code in said insert sequence to read said control map memory to obtain said second pointing vector to address said memory array, and to provide stored digital signals corresponding to said prerecorded sequence subsequent to said insertion point.

4. A dictation recorder selectively operable for recording dictation during a recording mode and for playing back recorded dictation during a playback mode, comprising:

- an addressable memory array for storing digital dictation signals in a plurality of sequences of contiguous addressable locations, each of said sequences beginning at a beginning address and ending at an addressable location containing a predetermined jump code;
- an analog to digital converter for providing said digital dictation signals in response to analog dictation input signals during said record mode;
- a digital to analog converter for providing reproduced analog signals in response to being provided with said digital dictation signals from said memory array;
- a control map memory for storing pointing vectors, each of said pointing vectors including a jump code address at which said predetermined jump code is stored and a beginning of one of said sequences of addressable locations;
- a memory array address controller operative in said record mode for storing said digital dictation signals in said sequences of said addressable locations of said memory array;
- said controller being selectively operative during said record mode in response to receipt of a dictation control signal provided by a dictator for storing said predetermined jump code at a particular addressable location corresponding to the point at which said dictation control signal was provided, and for providing the address of said particular addressable location for storage in said control map memory as said jump code address of one of said pointing vectors;
- said controller being operative during said playback mode to provide stored digital dictation signals to said digital to analog converter from one of said sequences of addressable locations of said memory array beginning at said beginning address until an occurrence of said predetermined jump code; and
- said controller being further responsive during said playback mode to each occurrence of said predetermined jump code to read a particular one of said pointing vectors from said control map memory which contains said jump code address associated with said particular addressable location at which said jump code is stored, and thereafter to sequentially provide said stored digital dictation signals to said digital to analog converter from a subsequent one of said sequences of addressable locations beginning at said beginning address of said particular one of said pointing vectors.

5. A dictation recorder as recited in claim 4, wherein said dictation control signal is a delete signal, and wherein said controller is selectively operative during said record mode in response to receipt of an end signal provided by a dictator after said delete signal for providing the address of one of said addressable locations corresponding to the point at which said end signal was provided for storage in said control map memory as said beginning address of said particular one of said pointing vectors.

6. A dictation recorder as recited in claim 4, wherein said dictation control signal is an insert signal, wherein said particular addressable location corresponding to the point at which said insert signal was provided is a first particular addressable location, wherein said particular one of said pointing vectors is a first pointing vector, and wherein said controller is selectively operative during said record mode in response to receipt of an end signal provided by a dictator after said insert signal for storing said predetermined jump code at a second particular addressable location corresponding to the point at which said end signal was provided, and for providing the address of said second particular addressable location for storage in said control map memory as said jump code address of a second pointing vector.

7. A dictation recorder as recited in claim 6, wherein said controller is further operative during said record mode in response to receipt of said insert signal for providing the address of one of said addressable locations corresponding to the point at which said insert signal was provided for storage in said control map memory as said beginning address of said second pointing vector.

8. A dictation recorder as recited in claim 6, wherein said controller is further operative during said record mode in response to receipt of said insert signal for providing an address of an addressable location in said memory array available for storage of said digital dictation signals, for storage in said control map memory as said beginning address of said first pointing 9. A dictation recorder as recited in claim 4, wherein said dictation control signal is a move signal, wherein said particular addressable location corresponding to the point at which said move signal was provided is a first particular addressable location, wherein said particular one of said pointing vectors is a first pointing vector, wherein said controller is selectively operative during said record mode in response to receipt of an end signal provided by a dictator after said move signal for storing said predetermined jump code at a second particular addressable location corresponding to the point at which said end signal was provided, and for providing the address of said second particular addressable location for storage in said control map memory as said jump code address of a second pointing vector, and wherein said controller is selectively operative during said record mode in response to receipt of a move insert signal provided by a dictator afer said end signal for storing said predetermined jump code at a third particular addressable location corresponding to the point at which said move insert signal was provided, and for providing the address of said third particular addressable location for storage in said control map memory as said jump code address of a third pointing vector.

10. A dictation recorder as recited in claim 9, wherein said controller is further operative during said record mode in response to receipt of said move signal for providing the address of one of said addressable locations corresponding to the point at which said move signal was provided for storage in said control map memory as said beginning address of said third pointing vector.

11. A dictation recorder as recited in claim 9, wherein said controller is further operative during said record mode in response to receipt of said end signal for providing the address of one of said addressables location corresponding to the point at which said end signal was provided for storage in said control map memory as said beginning address of said first pointing vector.

12. A dictation recorder as recited in claim 9, wherein said controller is further operative during said record mode in response to receipt of said move insert for providing the address of one of said addressable locations corresponding to the point at which said move insert signal was provided for storage in said control map memory as said beginning address of said second pointing vector.

* * * * *